US 6,665,165 B2

(12) United States Patent
Schaefer

(10) Patent No.: US 6,665,165 B2
(45) Date of Patent: Dec. 16, 2003

(54) CONTROL METHOD FOR THE ACTUATOR OF A VARIABLE VALVE TRAIN

(75) Inventor: Martin Schaefer, Maisach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 77 days.

(21) Appl. No.: 09/995,604

(22) Filed: Nov. 29, 2001

(65) Prior Publication Data

US 2002/0066425 A1 Jun. 6, 2002

(30) Foreign Application Priority Data

Nov. 29, 2000 (DE) .......................... 100 59 285

(51) Int. Cl.[7] .............................................. H01H 47/14
(52) U.S. Cl. ................................................... 361/168.1
(58) Field of Search ....................... 361/168.1, 152–156, 361/187, 159, 160, 170, 189, 190; 123/90.11, 490, 472; 257/129.01, 129.15; 239/88, 90, 91, 92, 93, 94, 585.1–585.5

(56) References Cited

U.S. PATENT DOCUMENTS

| 5,778,840 A | | 7/1998 | Murata et al. | |
| 5,937,805 A | * | 8/1999 | Matsumara | ............... 123/90.15 |
| 5,986,871 A | * | 11/1999 | Forck et al. | ................ 361/160 |
| 6,113,014 A | * | 9/2000 | Coldren et al. | ............. 361/143 |

FOREIGN PATENT DOCUMENTS

| DE | 37 07 770 A1 | 9/1988 |
| DE | 40 16 816 A1 | 11/1991 |
| DE | 44 13 443 A1 | 10/1995 |
| DE | 19705766 | 8/1998 |
| DE | 199 30 987 A1 | 1/2000 |
| EP | 0821141 | 1/1998 |
| EP | 0852287 | 7/1998 |
| WO | 95/09298 | 4/1995 |

OTHER PUBLICATIONS

European Search Report.

* cited by examiner

*Primary Examiner*—Edward H. Tso
*Assistant Examiner*—Pia Tibbits
(74) *Attorney, Agent, or Firm*—Crowell & Moring LLP

(57) ABSTRACT

The invention relates to a control method for the electrical actuator of a variable valve train, the actuator being embodied in the form of a worm gear in which a sensor detects a position value (measured position value) of an eccentric shaft, a control difference is generated in a feedback branch with the use of the measured position value, and the electrical actuator is actuated. To suppress interferences in the control system, an observer value is formed that is associated with the position value from the pulse duty factor of the pulse-width modulation. The observer value is composed to a comparison value formed from the measured position value. The detected measured position value is not accepted if the deviation of the observer value from the comparison value exceeds a defined limit.

21 Claims, 3 Drawing Sheets

CONTROL METHOD FOR THE ACTUATOR OF A VARIABLE VALVE TRAIN

BACKGROUND AND SUMMARY OF THE INVENTION

This application claims the priority of German Application No. 100 59 285.6, filed Nov. 29, 2000, the disclosure of which is expressly incorporated by reference herein.

The invention relates to a control method for the electrical actuator of a variable valve train, the actuator being embodied in the form of a servo motor that drives a shaft using a-worm gear. A sensor detects a position value (measured position value) of the shaft, a control difference is generated in a feedback branch with the use of the measured position value, and the electrical actuator is activated as a function of the control difference.

In internal-combustion engines, one of the objectives is to alter the height of the valve stroke, particularly of the gas-intake valves, as a function of the operating point, for the charge-exchange process. If this is accomplished, the use of a throttle valve can be extensively eliminated, which would lead to reduced fuel consumption, because the disadvantageous effects of throttle valves include high consumption.

A known embodiment of a so-called completely variable valve train provides an eccentric shaft for adjusting the height of the valve stroke. The shaft is acted upon by a servo motor, and a worm gear is interposed between the two. As dictated by structural conditions, the worm gear possesses a so-called clearance, in which the eccentric shaft can rotate slightly without the actuator being activated. The effect of an external mechanical interference, as induced, for example, by the camshaft influence, may cause the shaft to move within the clearance of the worm gear. This in turn causes a position sensor that is disposed in the region of the main drive pinion of the worm gear pair to indicate a change in position, although the actuator has not been activated. In particular, the rapid change in the position signal due to the change in the contact of the flanks in the gear excites the control system, and, consequently, leads to an activation of the actuator. This results particularly in an increased current consumption by the system.

It is the object of the present invention to suppress interferences that occur in the control system when the gear clearance is passed through, without significantly limiting the control dynamics or control precision at the same time.

This object is accomplished by a control method for the electrical actuator of a variable valve train, the actuator being embodied in the form of a worm gear, in which a sensor detects a position value (measured position value) of an eccentric shaft, a control difference is generated in a feedback branch with the use of the measured position value, and the electrical actuator is activated as a function of the control difference. An observer value that is associated with the position value is formed from a pulse duty factor of a pulse-width modulator. The observer value is compared to a comparison value formed from the measured position value. The detected measured position value is not accepted if the deviation of the observer value from the comparison value exceeds a defined limit.

The electrical actuator is activated, preferably via pulse-width modulation, as a function of a control difference ascertained with a measured position value. To generate an associated pulse duty factor, a control difference is assessed in a controller. The controller itself is preferably embodied to operate digitally. The control difference comprises, for example, a desired value that is preset by the engine control unit, and an acknowledged position value for the eccentric shaft. Because the measured position value may be affected by interfering variables, it is necessary to perform a relevant plausibility check. For this purpose, an observer value that is associated with the position value is formed from the pulse duty factor of the pulse-width modulation. This observer value is compared to a comparison value obtained from the actual measured position value. If the difference between the observer value and the comparison value exceeds a defined limit or amount, the measured position value itself is not accepted.

The measured position value is thus checked in terms of its plausibility with available state information.

Because the pulse duty factor is approximately proportional to the current flowing through the electrical actuator when the actuator is at still stand, and is therefore proportional to the maximum torque that the actuator can deliver, the values associated with the second derivative of the position value are preferably compared to one another.

The torque generated by the actuator effects an acceleration $\varphi$ the system. A theoretical acceleration $\hat{\varphi}$ determined as an observer value from the pulse duty factor is preferably compared to an actually determined acceleration $\varphi$ of the measured position value. This type of comparison of the angular accelerations allows the measured position values to be assessed, then filtered such that all ascertained sensor values that correspond to an angular acceleration located outside of the established limits are rejected as implausible.

If the sampling time of the controller $T_A$ is longer than that of the position sensor, it also appears useful to insert an actual-value filter. The actual-value filter filters out apparently implausible measured position values, prior to an averaging device, particularly for suppressing signal noise. If a differentiating transmission element is used in the feedback branch of the control method, the actual-value filter should be disposed upstream of this transmission element, of course, other transmission elements, such as proportional elements, can also be disposed, in series or in parallel, in the feedback branch. In many cases, however, filtering can be limited to the feedback branch with the differentiating transmission element, because the particularly rapid, temporary fluctuations that occur when the worm-gear clearance is passed through have a negative impact on this member. The dynamics of the control method, however, stipulate that the differentiating member be disposed in the feedback branch: high actuating dynamics can be attained with this arrangement.

The presetting of a desired value for forming the control difference and actuating the controller preferably originates in digital electronics of an engine that dictate the valve-stroke height by way of an adjustment of the eccentric shaft, depending on the operating point.

The actual position value is notably detected with a rotation sensor disposed on the eccentric shaft. All information can be detected and transmitted in time-discrete and digital form.

A nonlinear actual-value filter can preferably be used in the comparison of the observer and comparison values. Maximum and minimum values for the difference between the observation and comparison values can be defined in this nonlinear actual-value filter. A measured position value is accepted if the aforementioned difference lies in a range between the maximum and minimum values. As described above, the maximum value can be determined as the observer value from the pulse duty factor. A brake acceleration that occurs when the servomotor runs down without current can be selected as the minimum value.

If a pulse width ratio/pulse duty factor of zero is present, the positive and negative absolute values of this minimum value can be selected as the two limit values of the nonlinear actual-value filter.

If no accepted measured position values are present during a position-control cycle, the old state variables of the filter are used for the following cycle, especially if the nonlinear filter was disposed upstream for calculating them.

A so-called $D^2$ member is used to attain a second derivative of the measured position value. This member can effect a differentiation of detected values by forming finite differences. The acceleration is also possible through approximation with a cubic function (spline) using the last three valid position values.

Other objects, advantages and novel features of the present invention will become apparent from the following detailed description of the invention when considered in conjunction with the accompanying drawings.

DETAILED DESCRIPTION OF THE DRAWINGS

Figure 1:
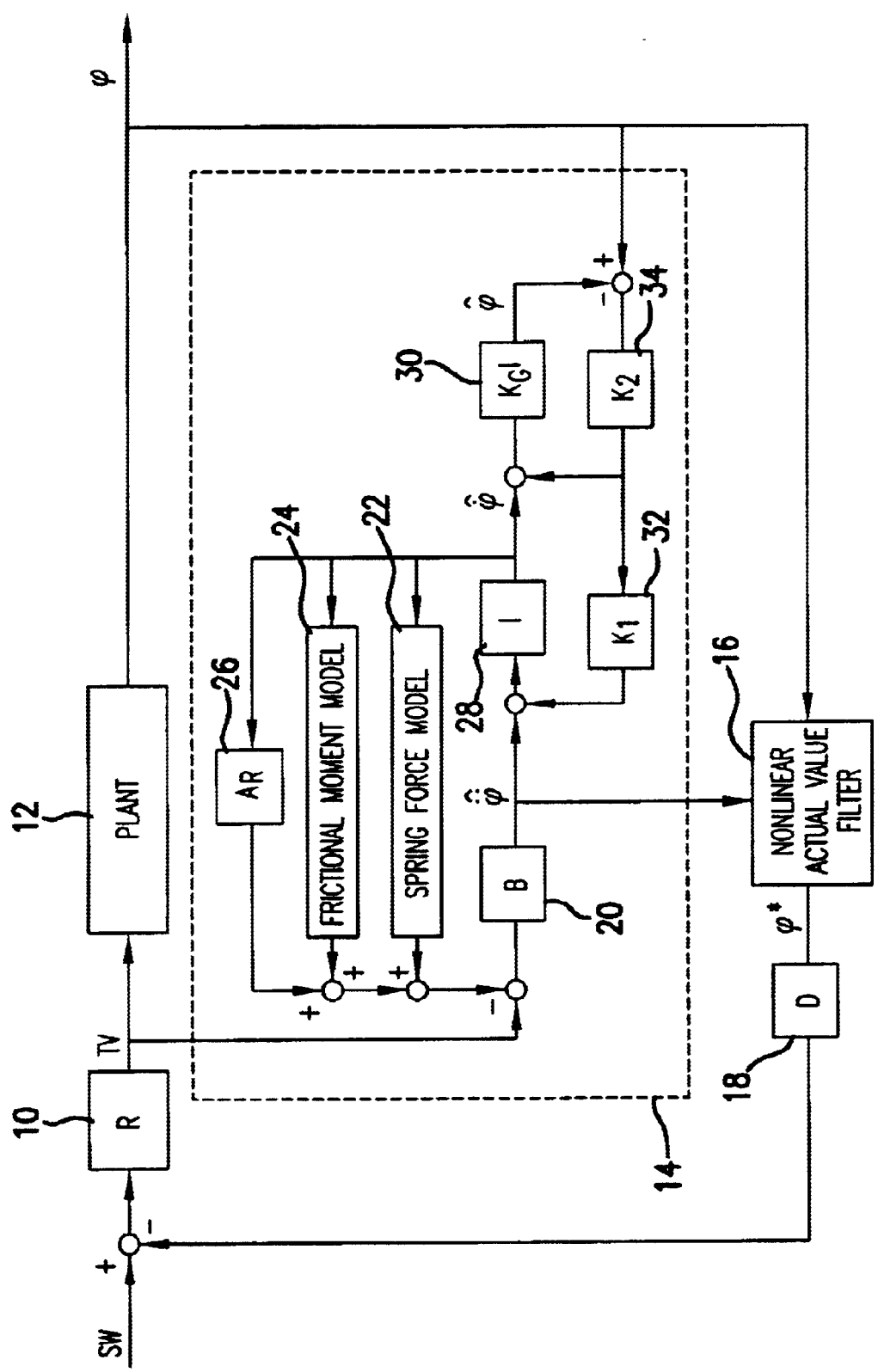
FIG. 1 is a control diagram of an embodiment of the present invention.

Several fundamental points are first addressed before the practical embodiments are described.

In a known, variable valve train, an eccentric shaft (not shown) adjusts rocking levers that act on cylinder valves. The eccentric shaft is in turn driven by way of a worm gear. A sensor detects the position of the eccentric shaft, and transmits it, in time-discrete and digital form, to a digital controller. The controller is responsible for positioning the eccentric shaft, and obtains a preset desired value from digital engine electronics. A reference filter contained in the controller assesses the control difference between the preset desired value and the measured actual position of the eccentric shaft (measured position value), and generates a pulse duty factor for a pulse-width-modulated actuation, with which the electrical actuator of the worm gear pair is activated.

As dictated by the control dynamics, a differentiating member is disposed in the feedback branch of a conventional control. Consequently, rapid interferences in the measured position value lead to a significant reaction of the controller, although the amplitude of the interference does not merit such a reaction. Pulse-shaped interferences in particular cause the actuator to be temporarily supplied with a current that changes its polarity, which severely stresses the electrical system.

In accordance with FIG. 1, digital engine electronics supply a preset desired value SW, which, with information that will be described later, forms a control difference that serves as an input signal for a controller R (reference numeral 10). The controller 10 assesses the control difference and generates a pulse-width-modulated actuation signal with a pulse duty factor TV. This signal is transmitted to the electrical actuator shown in the control path 12. The electrical actuator adjusts the eccentric shaft, by way of a worm gear. Disposed at the eccentric shaft, that is, on the side of the main drive pinion of the worm gear, is a sensor that generates a measured signal and emits a corresponding measured position value $\varphi$. This measured value $\varphi$ is fed back in a feedback branch, by way of a differentiating member 18, for forming the control difference. Using the measured position value, the differentiating member 18 generates a step response, whose characteristic can be established in a desired manner.

Because of the clearance of the worm gear, the measured position value $\varphi$ is affected by interference variables. The contact and frictional forces of intermediate levers associated with the engagement of the camshaft lead to a spurious torque onto the eccentric shaft. At some operating points, this dynamic stress suffices to temporarily cancel the polarity of the torque on the eccentric shaft. This causes the contacting flanks in the worm gear to change; the interference variable is thereby expected to exhibit interferences in the first motor order and its harmonics.

To suppress these interferences, the sole known state variable, namely the pulse duty factor TV, which is proportional to the actuation current of the electrical actuator, and thus to the moment generated from it when the actuator is inoperative, is used to generate an observer variable $\hat{\ddot{\varphi}}$ with the aid of an observation model 14. The observer variable is associated with the second derivative of the position value. In a nonlinear actual-value filter 16, which will be discussed in greater detail below, the observer variable $\hat{\ddot{\varphi}}$ is then compared to a comparison value that was determined from the measured position value $\varphi$ and the difference between the two values is employed in a plausibility check, which will be described below. The basis for this procedure is the fact that the observer variable $\hat{\ddot{\varphi}}$ determined with the use of a model essentially matches the comparison value, which was obtained from a measured position value that is not affected by interference variables.

The entire observer from FIG. 1, which is represented by a box 14, is explained below. The pulse duty factor TV is supplied to a proportional element 20, which utilizes it in generating the observer value $\hat{\ddot{\varphi}}$ with the proportionality, known per se, of the pulse duty factor TV to the current and engine moment. Using the observer value $\hat{\ddot{\varphi}}$, an integrator 28 generates a variable $\hat{\dot{\varphi}}$, which reflects a change in the position value. With this variable $\hat{\dot{\varphi}}$ and three additional models, namely the influence of the spring force 22, the influence of a frictional force 24 and the armature reaction $A_R$ 26, a further integrator 30 estimates a position value $\hat{\varphi}$. The difference between the actually determined measured position value $\varphi$ and the estimated position value $\hat{\varphi}$ is then used to correct for $\hat{\ddot{\varphi}}$ and $\hat{\dot{\varphi}}$ with correction parameters $K_1$ and $K_2$ (reference numerals 32 and 34) for suppressing a sustained deviation of the observer from the real angle.

In an ideal scenario, that is, when the different models 20, 22, 24 and 26 ideally represent the control path 12, the two parameters $K_1$ and $K_2$ could be selected to be zero.

Figure 3:
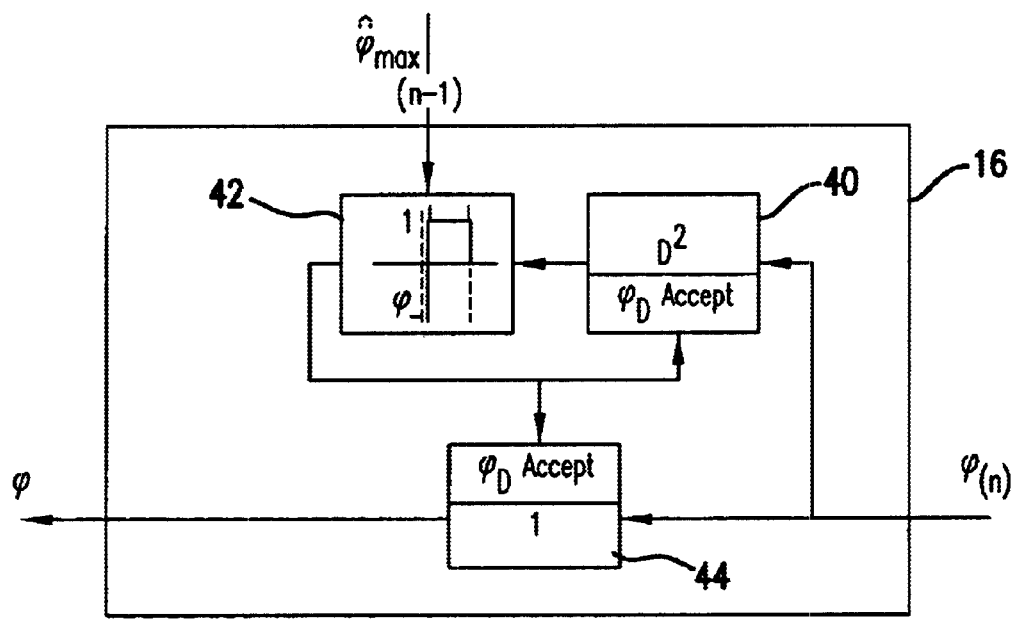
FIG. 3 is a block diagram of a nonlinear actual-value filter for use in the control processes illustrated in FIGS. 1 and 2.
Figure 4:
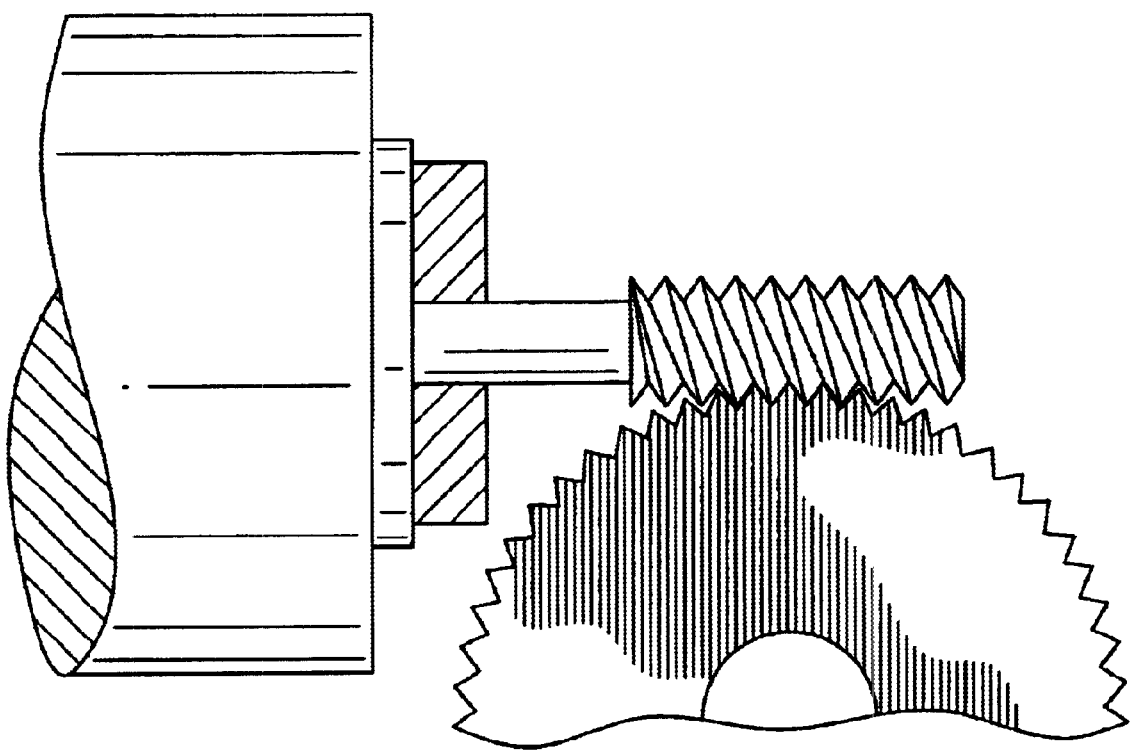
FIG. 4 is an illustration of a worm gear.

The observer variable $\hat{\ddot{\varphi}}$ is then compared to the second derivative of the measured position value $\varphi$, namely $\ddot{\varphi}$, in the nonlinear actual-value filter 16. The difference between the two variables is then used to decide whether the measured position value should be accepted or rejected. FIG. 3 illustrates an example of this type of actual-value filter. Before this is discussed in detail, however, a simplified version of an observer model will be presented.

Figure 2:
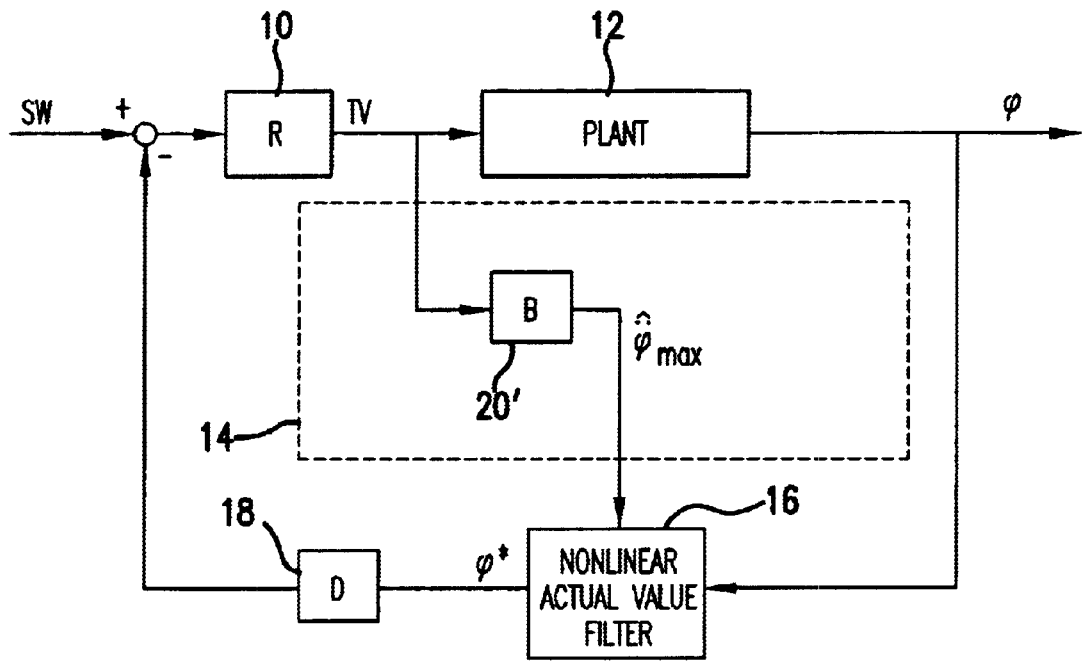
FIG. 2 is a simplified control diagram of a further embodiment of the present invention.

The observer model from FIG. 1 is fairly complex, and therefore calculation-intensive. In the simplified observer model 14' shown in FIG. 2, the correction models 22, 24, 26, 28 and 30 were essentially omitted; only the proportional element 20 was retained. This proportional element essentially contains engine constants.

The value $\varphi$ obtained from the pulse duty factor, which basically corresponds to the second derivative of the position value, namely $\ddot{\varphi}$, represents the maximum value for an acceptable acceleration, because neither the armature reaction due to the angular speed of the actuator, nor the frictional and spring forces, are taken into account. In this respect, the control structure of FIG. 2 models a simplified filter concept that essentially omits the complex observer structure.

The proportional element 20' forms only the variable $\ddot{\varphi}_{max}$ from the pulse duty factor. This variable is made available to the nonlinear actual-value filter 16 as $\ddot{\varphi}_{max}$ $n-1$. The advantage of this method is the low calculation outlay.

The nonlinear actual-value filter 16 in FIG. 3 operates with a lower limit $\ddot{\varphi}_{min}$ and an upper limit $\ddot{\varphi}_{max}$ for the acceleration. Moreover, a $D^2$ member 40 is provided for a double differentiation of the measured position signal $\varphi$. The last two valid values, as well as the current value of the measured position value $\varphi$, are required for this differentiation. The differentiation can be effected through the formation of finite differences. The actual interval between the employed values of $\varphi_n$ is to be used in forming the difference. The spacing of the center points between the valid sampling times is then applicable for the second difference. Thus, the second derivative of the measured position value is obtained at the output of the $D^2$ member 40. This information is fed into the nonlinear member 42. In the nonlinear member, an imaging function is defined, according to which the image value is "1" between the two limits $\ddot{\varphi}_{min}$ and $\ddot{\varphi}_{max}$. Outside of these limits, the image value is zero. The brake acceleration that occurs when the servomotor runs out in a direction without current is selected as the lower limit $\ddot{\varphi}_{min}$. The brake acceleration can be a function of the position and the direction of rotation. If the pulse duty factor TV is zero, the limits are formed by $+/- |\ddot{\varphi}_{min}|$.

If the value of the second derivative of the measured position value, that is, $\ddot{\varphi}$, lies within the limits of $\ddot{\varphi}_{max}$ and $\ddot{\varphi}_{min}$, the measured position value $\varphi$ is accepted. The value is transmitted to the $D^2$ member 40 and a switch 44. In the $D^2$ member, an accepted position value is used for the next differentiation step. An unaccepted position value, in contrast, is not used for a subsequent differentiation step.

In the switch 44, a measured position value is switched through if it is accepted. If it is not accepted, no value is conducted to the downstream members. A downstream member will supply the preceding value. This corresponds to the insertion of a holding element before the summation point for forming the control difference. If so-called D members (differential members) are inserted, they can take into consideration the time difference between consecutive position values. This results in the quantity $\varphi^*$ of accepted measured position values.

In particular, the uniqueness of the interference variables allows the present invention to be applied in a special manner in the variable valve-train system. This uniqueness is distinguished by the engagement of the camshaft and the reaction caused by the existence of gear clearances in the worm gear. The amplitude of the interference is limited. The magnitude of the interference is smaller than or identical to the stipulated control quality; in other words, it is not necessary to correct an interference of this nature. The speed at which the signal changes is considerably higher than appropriate for the actual state of the system. The original flank contact is usually resumed following the cam engagement.

The present method permits the suppression of interferences in the control system of a variable valve train with a worm gear, without significantly limiting the control dynamics or the control precision at the same time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control method for an electrical actuator of a variable valve train, said actuator being a worm gear operating on an eccentric shaft of the variable valve train, the method comprising the acts of:
   measuring, via a sensor, a position value of the eccentric shaft;
   forming an observer value associated with the measured position value from a pulse duty factor of a pulse-width modulation;
   forming a comparison value from the measured position value;
   comparing the observer value to the comparison value, wherein the measured position value is not accepted if a deviation of the observer value from the comparison value exceeds a defined limit;
   if accepted, generating a control difference signal in a feedback branch using the measured position value; and
   activating the electrical actuator as a function of the control difference signal.

2. The control method according to claim 1, wherein the observer value corresponds to an acceleration of a position value obtained from an observer model, and wherein the comparison value corresponds to a second derivative of the measured position value.

3. The control method according to claim 1, further comprising the act of using a preset desired value originating from digital engine electronics in forming the control difference signal.

4. The control method according to claim 2, further comprising the act of using a preset desired value originating from digital engine electronics in forming the control difference signal.

5. The control method according to claim 1, wherein the act of measuring the position value is carried out via a rotational-angle sensor arranged on the eccentric shaft.

6. The control method according to claim 1, wherein said control method detects and transmits signals in time-discreet and digital form.

7. The control method according to claim 1, further comprising the act of performing a differentiation with a differentiating member disposed in the feedback branch.

8. The control method according to claim 1, wherein said control method operates using digital componentry.

9. The control method according to claim 1, wherein the act of measuring the position value operates by sampling at a higher rate than a rate at which remaining control variables are updated.

10. The control method according to claim 1, wherein the act of comparing is carried out using a nonlinear actual-value filter.

11. The control method according to claim 10, wherein in the nonlinear actual-value filter, a maximum value and a minimum value are defined, and the measured position value is accepted if a comparison value lies between said maximum and minimum values.

12. The control method according to claim 10, wherein a maximum value is determined in the form of the observer value from a pulse duty factor.

13. The control method according to claim 11, wherein the maximum value is determined in the form of the observer value from a pulse duty factor.

14. The control method according to claim 10, wherein a minimum defined value is selected to be, in defined method situations, a brake acceleration occurring when a servomotor runs out without current.

15. The control method according to claim 11, wherein the minimum value is selected to be, in defined method situations, a brake acceleration occurring when a servomotor runs out without current.

16. The control method according to claim 12, wherein a minimum value is selected to be, in defined method situations, a brake acceleration occurring when a servomotor runs out without current.

17. The control method according to claim 10, wherein in the nonlinear actual-value filter, a maximum value and a minimum value are defined, and wherein with a pulse duty factor of zero, said limit values are determined by positive and negative absolute values of the minimum value.

18. The control method according to claim 1, further comprising the act of replacing unaccepted measured position values by a last valid measured position value for forming the control difference signal.

19. The control method according to claim 1, wherein a $D^2$ member is used for a double differentiation of accepted measured position signals.

20. The control method according to claim 19, wherein said double differentiation is effected through formation of finite differences.

21. The control method according to claim 2, wherein the second derivative of the measured position value is determined via an approximation of a cubic function involving the last three accepted position values.

* * * * *